(12) United States Patent
Krenz et al.

(10) Patent No.: US 8,145,144 B2
(45) Date of Patent: Mar. 27, 2012

(54) WIRELESS COMMUNICATION DEVICE EMPLOYING CONTROLLED INTER-PART IMPEDANCES FOR HEARING AID COMPATIBILITY

(75) Inventors: Eric L. Krenz, Crystal Lake, IL (US); Louis J. Vannatta, Crystal Lake, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 691 days.

(21) Appl. No.: 11/966,368

(22) Filed: Dec. 28, 2007

(65) Prior Publication Data

US 2009/0170450 A1    Jul. 2, 2009

(51) Int. Cl.
*H04B 1/38* (2006.01)

(52) U.S. Cl. ...... 455/90.3; 455/80; 455/575.1; 381/330; 379/428.01; 379/428.02; 379/433.01

(58) Field of Classification Search .................. 455/90.3; 381/330; 379/428.01, 428.02, 433.01
See application file for complete search history.

(56) References Cited

U.S. PATENT DOCUMENTS

| | | | |
|---|---|---|---|
| 5,014,346 A | 5/1991 | Phillips et al. | |
| 5,497,339 A | 3/1996 | Bernard | |
| 5,897,382 A * | 4/1999 | Takahashi | 439/31 |
| 6,600,450 B1 | 7/2003 | Efanov et al. | |
| 6,781,551 B2 | 8/2004 | Gerber | |
| 6,806,835 B2 | 10/2004 | Iwai et al. | |
| 6,839,577 B2 | 1/2005 | Krenz et al. | |
| 7,214,067 B2 * | 5/2007 | Zaderej | 439/31 |
| 7,612,722 B2 * | 11/2009 | Haho et al. | 343/702 |
| 7,729,128 B2 | 6/2010 | Leininger et al. | |
| 2001/0051510 A1 | 12/2001 | Nakamura | |
| 2004/0222926 A1 | 11/2004 | Kontogeorgakis et al. | |
| 2006/0029217 A1 | 2/2006 | Hayes | |
| 2006/0048340 A1 | 3/2006 | Zaderej | |
| 2007/0003088 A1 * | 1/2007 | Lehtola | 381/330 |
| 2007/0176833 A1 | 8/2007 | Haho et al. | |

FOREIGN PATENT DOCUMENTS

| | | |
|---|---|---|
| EP | 0622864 A1 | 11/1994 |
| GB | 2311903 A | 10/1997 |
| KR | 1020060067165 A | 6/2006 |
| WO | 2006124066 A1 | 11/2006 |

OTHER PUBLICATIONS

Search Report Dated May 29, 2009, cited in related PCT Application No. PCT/US2008/087896.
Patent Cooperation Treaty, "PCT Notification of Transmittal of the International Search Report and the Written Opinion of the International Searching Authority, or the Declaration", Dec. 29, 2006, pp. 1-9, PCT/US2006/033526.
United States Patent and Trademark Office, "Non-Final Office Action Summary", Jun. 17, 2009, pp. 1-11, U.S. Appl. No. 11-239,265.
European Patent Office, "Communication", Oct. 10, 2008, pp. 1-2, EPC Appln. No. 06802470.2.
Korean Intellectual Property Office, "Notice of Preliminary Rejection" translation, Jul. 6, 2011, pp. 1-4, Korean Patent Application No. 10-2010-7014099.

* cited by examiner

*Primary Examiner* — Tuan H Nguyen (57) ABSTRACT

A method and apparatus for providing a hearing aid compatible wireless electronic device is disclosed. The apparatus may include a lower housing having a wireless transceiver, upper housing including an earpiece, hinge assembly, and a pair of reactive matching element along with predefined placement of the wireless transceiver. The reactive matching element can be implemented at different chassis inductances to achieve hearing aid compatibility within other design constraints. Implemented as a switched circuit or reactance filter circuit to create a reactance appropriate for a band of operation during transmission in that band.

20 Claims, 5 Drawing Sheets

WIRELESS COMMUNICATION DEVICE EMPLOYING CONTROLLED INTER-PART IMPEDANCES FOR HEARING AID COMPATIBILITY

BACKGROUND OF THE INVENTION

1. Field of the Invention

The present invention relates generally to the field of wireless communication devices. More particularly, the present invention relates to a wireless communication device for compatible operation with hearing aid devices.

2. Introduction

Wireless communication devices or mobile phones are often not compatible with many hearing aids due to the potential for radio frequency (RF) interference in the form of scattered electro magnetic fields generated by the devices while in use. When a mobile phone is in communication with its network, an electromagnetic field (e-field) is present around the mobile phone antenna. The pulsing energy of the e-field is picked up by the hearing aid's microphone or telecoil circuitry and heard as a buzzing sound through the hearing aid.

The Federal Communication Commission has mandated that phone manufacturer's models be Hearing Aid Compatible (HAC). HAC compliance constrains E and H fields in a measurement plane above the earpiece (speaker) to be below a specified level. Because of the power levels involved and the details of how the digital modulation produces audible interference, this requirement is particularly onerous for Global System and for Mobile Communications (GSM) phones, which are often challenged to meet the required field values while maintaining good call performance.

Therefore, a HAC-reduction technique is needed for various phone form factors and designs, to ensure compliance with this mandate. In particular, clam and slider phones comprise a large fraction of phones sold in the US market, and require HAC solutions that will not degrade the other radiated performance parameters.

SUMMARY OF THE INVENTION

A method and apparatus for providing a hearing aid compatible wireless electronic device is disclosed. The apparatus may include a lower housing having a wireless transceiver, upper housing including an earpiece, hinge assembly, and a pair of reactive matching element along with predefined placement of the wireless transceiver. The reactive matching element can be implemented at different chassis inductances to achieve hearing aid compatibility within other design constraints. Implemented as a switched circuit or reactance filter circuit to create a reactance appropriate for a band of operation during transmission in that band.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The invention comprises a variety of embodiments, such as a method and apparatus and other embodiments that relate to the basic concepts of the invention.

This invention concerns wireless communication device employing controlled inter-part impedances for hearing aid compatibility.

A wireless communication device may be a portable MP3 player, communication device, satellite radio receiver, AM/FM radio receiver, satellite television, portable music player, electronic device, portable computer, wireless radio, wireless telephone, portable digital video recorder, cellular telephone, mobile telephone, personal digital assistant PDA), or combinations of the above, for example.

Figure 1:
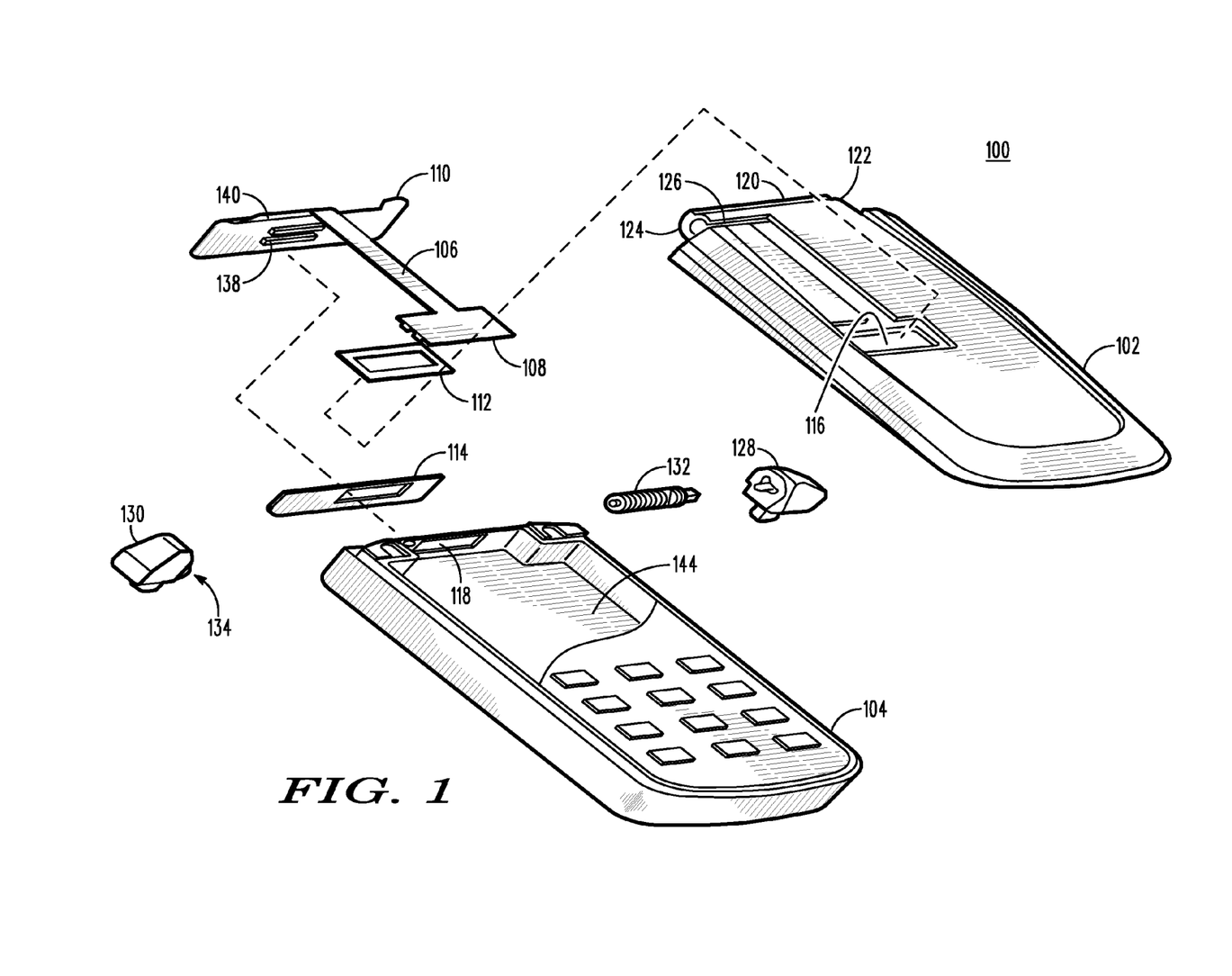
FIG. 1 is an exploded view of a wireless communication device with a first and second knuckle in accordance with a possible embodiment of the invention.

FIG. 1 illustrates an exemplary diagram of wireless communication device with a first and second knuckle in accordance with a possible embodiment of the invention.

FIG. 1 is an exploded view of a wireless communication device in accordance with the present invention. Communication device 100 is a clam style device or sliders and other form factors where the phone has two major parts having first and second compartments 102, 104 respectively. The wireless communication device also comprises an antenna (not shown) for transmitting and receiving signals from other communication devices. In accordance with the present invention, a flex 106 having first and second ends 108, 110 electrically interconnects the first compartment 102 to the second compartment 104 and seals the first compartment independently from the second compartment. A hinge assembly 122 mechanically couples the first compartment 102 to the second compartment 104 and provides a path through which the flex 106 is guided.

The first and second seals 114, 116 are coupled to the first and second ends 108, 110 of the flex 106, the first seal for sealing the first compartment 102 and the second seal for sealing the second compartment 104. The first compartment 102 includes a first recessed opening 116, and the second compartment 104 includes a second recessed opening 118. Electronic contacts 136 are located on the first end 108 of the flex 106 and are interconnected to electronic contacts 138 located on the second end 110 of the flex. The first and second ends 108, 110 of the flex 106 align within and couple to the recessed openings 116, 118 via the first and second seals 112, 114 respectively. Independent perimeter seals are thus formed around each set of contacts 136, 138. The seals 112, 114 prevent fluid intrusion into the compartments 102, 104.

Hinge assembly 122 mechanically couples the first compartment 102 to the second compartment 104. In accordance with a preferred embodiment of the invention, hinge assembly 122 includes a barrel 120 having first and second ends 122, 124 and a slot 126 formed therein. The slot 126 is used to guide the flex 106 from the first compartment 102 through the barrel 120. Hinge assembly 122 further includes first and second knuckles 128, 130 respectively, the first knuckle 128 for coupling to the first end 124 of the barrel 120, and the second knuckle for coupling to the second end 122 of the barrel. A cam spring 132 is coupled to the first knuckle 128 within the barrel 120. The first knuckle 128 and second knuckle 130 can include an aperture 134 through which to guide the flex 102 from the slot 126 to the second compartment 106. Flex 106 preferably includes a service loop portion 140 to provide leeway to accommodate the pivot motion created when the clam style communication device opens and closes.

While hinge assembly 122 has been described in terms of a preferred embodiment, other hinge configurations may also be used without departing from the scope of the interconnect assembly of the present invention. For example, barrel 120 is shown integrated as part of the first compartment 102, however this barrel can also be integrated as part of the second compartment 104 or even formed as an independent component. While the second end 110 of the flex 106 and corresponding seal 114 are shown aligned with a recessed opening 118 located on a side wall of the communication device 102, however this recessed opening 118 could also be formed in a bottom surface 144 of the second compartment 104. In this configuration, the flex 106 would wrap around to surface 144 in order to accommodate the different interconnect.

Figure 2:
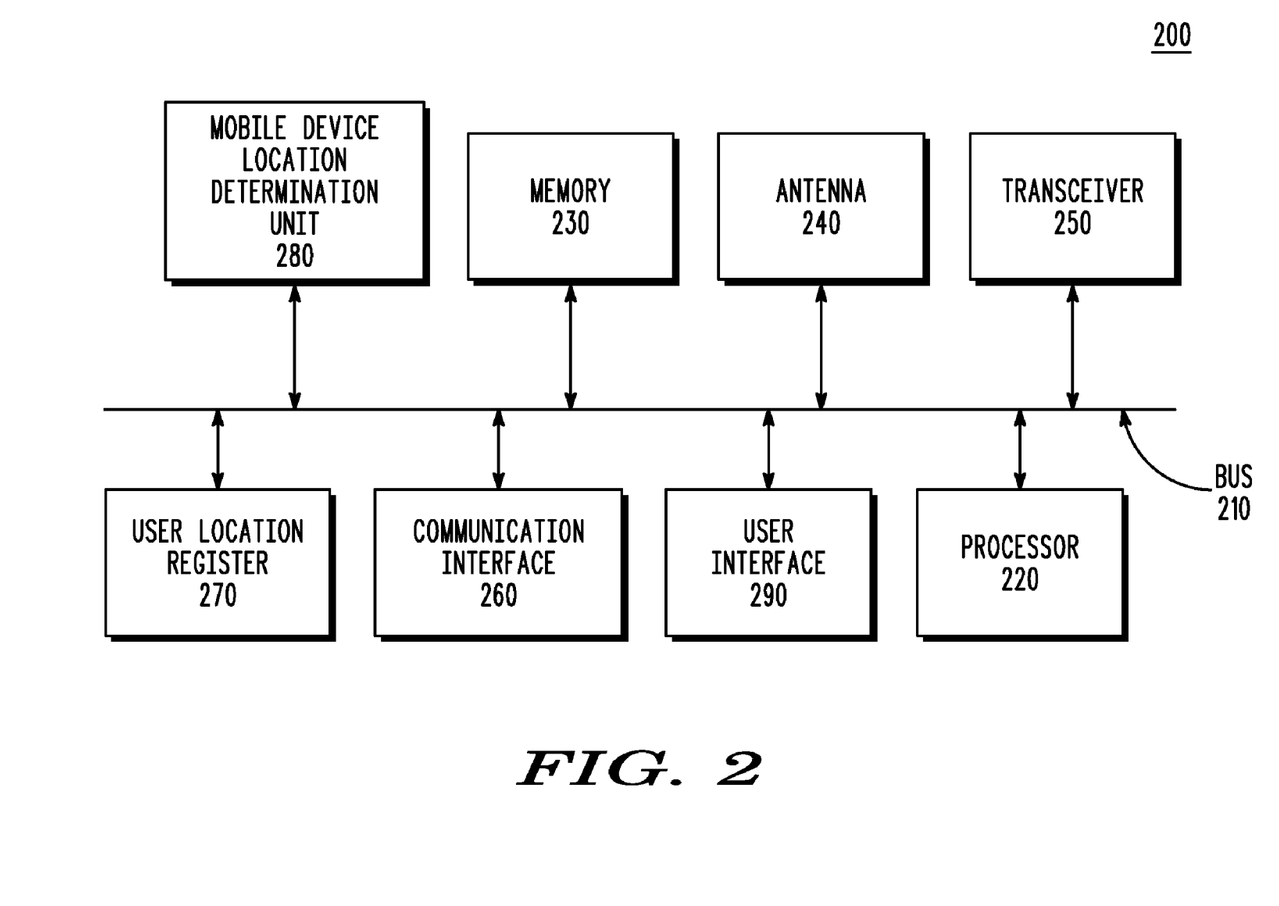
FIG. 2 illustrates a block diagram of an exemplary wireless communication device in accordance with a possible embodiment of the invention.

FIG. 2 shows a more detailed exemplary block diagram of wireless communication device 200 of FIG. 1.

The wireless communications device 200 may include a bus 210, a processor 220, a memory 230, an antenna 240, a transceiver 250, a communication interface 260, a user location register 270, a wireless device location determination unit 280, and a user interface 290. Bus 210 may permit communication among the components of the wireless communication device.

Processor 220 may include at least one conventional processor or microprocessor that interprets and executes instructions. Memory 230 may be a random access memory (RAM) or another type of dynamic storage device that stores information and instructions for execution by processor 220. Memory 230 may also include a read-only memory (ROM) which may include a conventional ROM device or another type of static storage device that stores static information and instructions for processor 220. Additionally, memory 230 may include any type of media, such as, for example, magnetic or optical recording media and its corresponding drive.

Transceiver 250 may include one or more transmitters and receivers. The transceiver 250 may include sufficient functionality to interface with any network or communications station and may be defined by hardware or software in any manner known to one of skill in the art. The processor 220 is cooperatively operable with the transceiver 250 to support operations within the communications network. The transceiver 250 transmits and receives transmissions via one or more of the antennae 240 in a manner known to those of skill in the art.

Communication interface 260 may include any mechanism that facilitates communication via the network. For example, communication interface 260 may include a modem. Alternatively, communication interface 260 may include other mechanisms for assisting the transceiver 250 in communicating with other devices and/or systems via wireless connections.

User interface 290 may include one or more conventional input mechanisms that permit a user to input information, communicate with the wireless communication device, and/or present information to the user, such as a an electronic display, microphone, touchpad, keypad, keyboard, mouse, pen, stylus, voice recognition device, buttons, one or more speakers, etc.

While the wireless communication device 200 is shown as an example, one of skill in the art may appreciate that any known or future-developed combination of location determination systems may be used to track the location of the user. The user location register 270 is used to store the locations of the user as determined by the wireless device location determination unit 280 via a global positioning system (GPS) device, for example.

For instance, in one possible manner to perform the user location tracking process, the wireless device location determination unit 280 may periodically record the location of the wireless communication device 200 and its user in the user location register 270, at various times. To minimize network load, the user's location/time file and identity information may be uploaded during periods of reduced or idle network traffic, such as the middle of the night, for example.

The wireless communication device 200 may perform such functions in response to processor 220 and/or wireless device location determination unit 280 by executing sequences of instructions contained in a computer-readable medium, such as, for example, memory 230. Such instructions may be read into memory 230 from another computer-readable medium, such as a storage device or from a separate device via communication interface 260.

Figure 3:
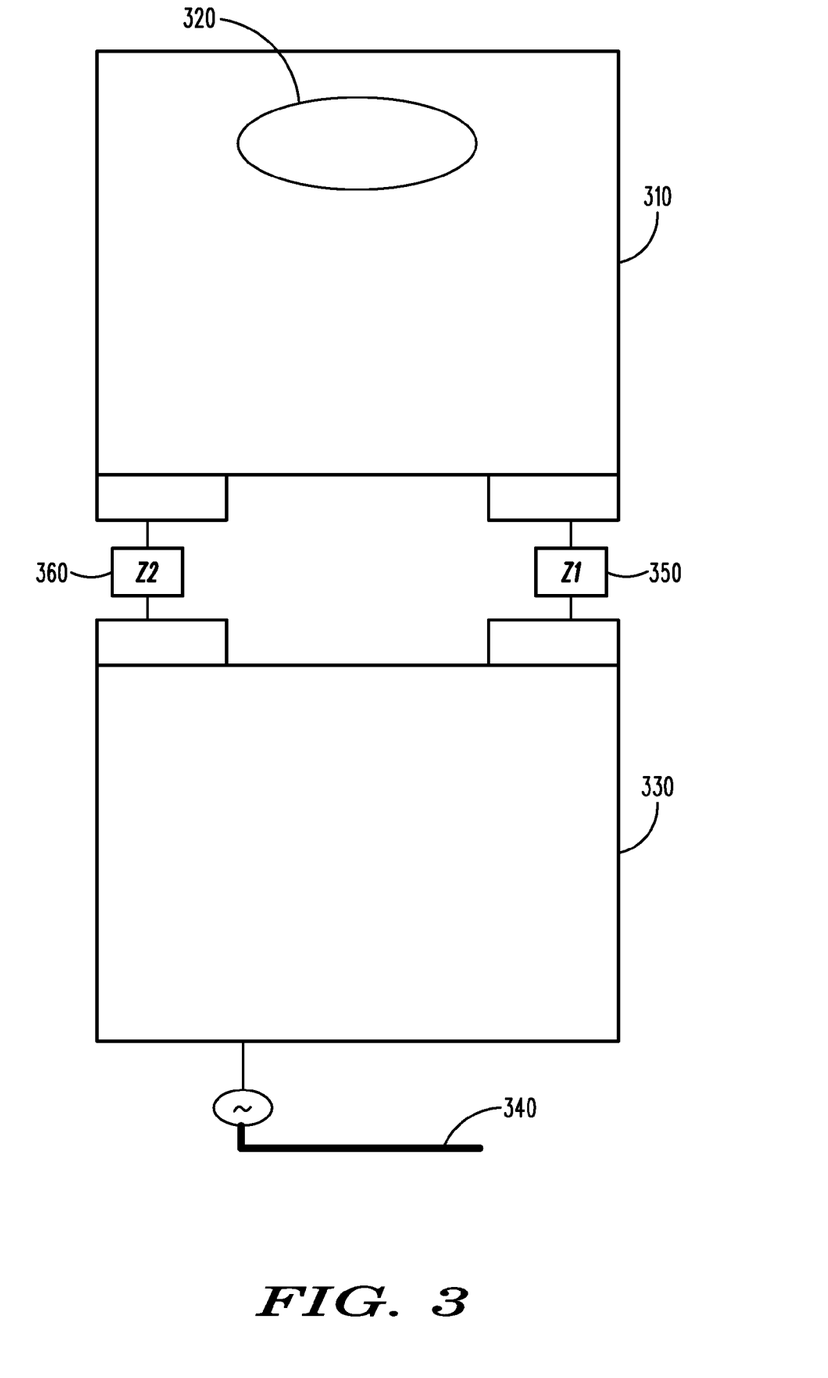
FIG. 3 illustrates a block diagram of an exemplary chassis with knuckle impedance for a wireless communication device in accordance with a possible embodiment of the invention.

FIG. 3 illustrates a block diagram of an exemplary chassis 300 with knuckle impedance for a wireless communication device in accordance with a possible embodiment of the invention. In particular, the exemplary chassis 300 shows a first ground plane 310 positioned at the upper housing of the wireless communication device, an earpiece 320, a second ground plane 330 positioned at the lower housing of the wireless communication device, an antenna for transmitting and receiving signals, a first electrical element 350 coupling the first and second planes, and a second electrical element for coupling the first and second planes. It should be noted that the first electrical element has a first electrical characteristic and the second electrical element has a second electrical characteristic.

Antenna 340 is coupled to the second ground plane 330 such that together, the antenna ground plane pair forms a resonant pattern when the antenna actively radiates. The antenna may be of any type, including Folded-J-Antenna (FJA), monopole, branched, dipole, PIFA, and the like. Where the antenna 340 is resonantly coupled to the second ground plane 330, it is important that the first ground plane 310 not resonate with the antenna 340 at the transmission/reception frequencies. If it were, currents in the region of the first ground plane 310 would be increased, increasing electric and magnetic fields that adversely interfere in the audio band with the user's hearing aid. Preferably, the separation distance between the first ground plane 310 and the second ground plane 330 should be as large as possible. As it is well known to those in the art the distance between the source of the electromagnetic field (Antenna) and the target hearing aid) is an important constraint since e-fields decrease as one moves away from the source. Because of the increased separation thus achieved between the antenna 340 and the electronic hearing aid (not shown), the wireless communication device advantageously reduces undesired coupling from the antenna to the electronic hearing aid without the need for special shielding arrangements. As a result, this configuration is beneficial from a hearing aid compatibility (HAC) standpoint. Moreover, this also helps reduce specific absorption rate (SAR), as will be appreciated by those skilled in the art. However, due to the decreasing dimensions of wireless communication devices the minimization of electric field at the earpiece region is more difficult to achieve. Hinge impedance position at the hinge assembly of a folding phone provides a mechanism for attenuating the movement of the radiation towards the earpiece. In the case of an FJA antenna position away from the earpiece, hinge impedance is a tuning parameter for HAC performance at any band. Simply stated wherein the transceiver is tuned to emit and receive radiation at a range of wavelengths and wherein a first electrical element and/or a second electrical element by their frequency-dependent nature can be tuned for the range of emitted or received wavelengths. Additionally, the hinge impedance can be selected to meet different physical dimensions of the phone, the hinge knuckles, and the ground planes. Thus, the one or more impedance can be selected for various parameters that influence the e-field and h-field that influence hearing aid compatibility and operating parameters such as SAR, wherein the first and second electrical elements are selected based on transceiver feed and lower housing and upper housing dimensions.

The electrical characteristics of first electrical element 350 and second electrical element 360 are impedance elements between the two halves of the wireless communication device. The impedance may be achieved either through discrete reactive elements, or through the physical geometry of the contacts between the planes. The impedance may also be achieved through the physical dimensions of the wireless communication device such the impedance form by first knuckle 128 and second knuckle 130. Additionally, the planes form a capacitance circuit that varies based on the position and geometry of both the upper housing and the lower housing. If the desired capacitance can be achieved the impedance elements can be shorted and in some instances removed from the circuit. However, it may be desirable to add an additional resistive element to the impedance element(s) to widen the bandwidth and achieve HAC within other constraints. Thus, these impedances can be formed either by the mechanics of the phone such as a conductive short formed by a scraping contact or some inductance formed by a flex circuit through the hinge assembly, or deliberately by the introduction of circuit elements in series with those mechanical elements, or manipulation of the mechanical elements (knuckle) to realize a desired electrical impedance. The values of first electrical element 350 and second electrical element 360, when adjusted independently, have a profound effect on the Hearing Aid Compatibility (HAC) performance (E and H fields across the HAC measurement grid position near the earpiece 320) of the wireless communication device.

In a first scenario, an implementation of different chassis inductances or reactances at each knuckle so as to minimize HAC within other design constraints. As noted above the distance between the antenna 340 and the earpiece 320 has an affect on hearing aid compatibility. As noted above HAC improves with an increase in distance. In cases where physical distance cannot be increased or needs to be decreased the reactances can be selected based on the asymmetry of the antenna feed relative to the chassis of the wireless communication device. Another physical parameter that may effects the E and H fields at earpiece 320 is the proximity of the first knuckle 128 to the second knuckle 130. Selecting different reactances can overcome the increase fields due to the width between hinge knuckles or the phase shift across the width.

In the first scenario, the impedances are physically changed or selected to accommodate dimensional constraints of the wireless communication device. A second scenario would be to make at least one of the impedances a switch circuit that could be tuned to different operational frequencies (scenarios) such as national guidelines for HAC or frequency operations. Each of the electrical elements may be selectively switched across the first plane and second plane. For example, a switch or relay connected to each impedance or for that matter the impedance itself may be controlled by an external controller (not shown). The location of each electrical element with respect to the planes determines the distance that current will have to travel through the ground planes to or from antenna 340. The wireless communication device can be made compliant to any territory that the device is taken to by the user. The switch circuit would make the first electrical device and the second electrical devices variable impedance device that would affects the effective capacitance between first plane and the second plane. The impedance of switchable electrical device can be changed by a signal sent from processor 220 as it is well know to those in the art. One scenario is to make the switch circuit responsive to the currently selected band of transmission. This can be implemented rather easily since the processor knows the current operating band of antenna 240, the processor can switch the electrical element to vary the impedance to operate at the desired level. Another scenario is to make the switch circuit responsive to which continental bandset the wireless communication device is currently operating in, such that effective quad-band operation can be maintained while HAC is met when operating in those markets (territories) that have promulgated the requirement. Again this information is available to processor 220 and with a driving signal it can change the impedance of the electrical element. Yet another scenario is to make the switch circuit responsive to flip position, so as to provide SAR benefit in a flip-closed in addition to HAC improvement at flip open. An open or close signal can be sent to processor 220 to change the impedance based on the position of the wireless communication device.

A third scenario is making at least one of the impedances a filter circuit such that the desired reactance can be made appropriate for each band of operation during transmission in that band, without using an active switch device. Variable impedance for at least one of the electrical elements that tracks or follows the operating frequency of the wireless communication device. A reactive or resonating circuit could be positioned in one of the knuckles of the device causing variable impedance that is a function of the operating frequency.

As demonstrated above the impedances can be selected to meet the operating requirements in addition to the regulatory requirements for the wireless communication device: (a) In both high and low bands, substantial HAC reductions are obtained by proper selection of the knuckle inductances; (b) For a given band, the optimal inductance value at each knuckle can be selected to meet HAC and SAR goals; (c) The optimal inductance values for each knuckle are generally different between high band and low band; (d) At low band in particular, knuckle impedance also significantly influences other antenna metrics like return loss or efficiency; hence impedances at low band must be selected to properly trade-off HAC and efficiency. In the preferred embodiment, inductance is used to illustrate the tuning requirements, however, it is possible that impedance other than an inductance may be used or required depending on the phone geometry. Based on the physical dimensions of the device and different bands of operation it is necessary to provide different impedances at each knuckle. It may also be desirable to change the knuckle impedance as a function of operating mode of the device, for example to minimize HAC in GSM mode but maximize TIS in UMTS mode. In present phone designs, one knuckle's impedance may be limited to a moderate range of inductances, by virtue of the fact that the flex goes through that knuckle. The optimization may still be done by placing the appropriate circuit to realize the desired inductance(s) at the other knuckle, according to a desired optimization for each band. In order to realize different impedances per band as required, one (or both) of the knuckle impedances can be realized as either a band-switched circuit or a filter circuit.

Figure 4:
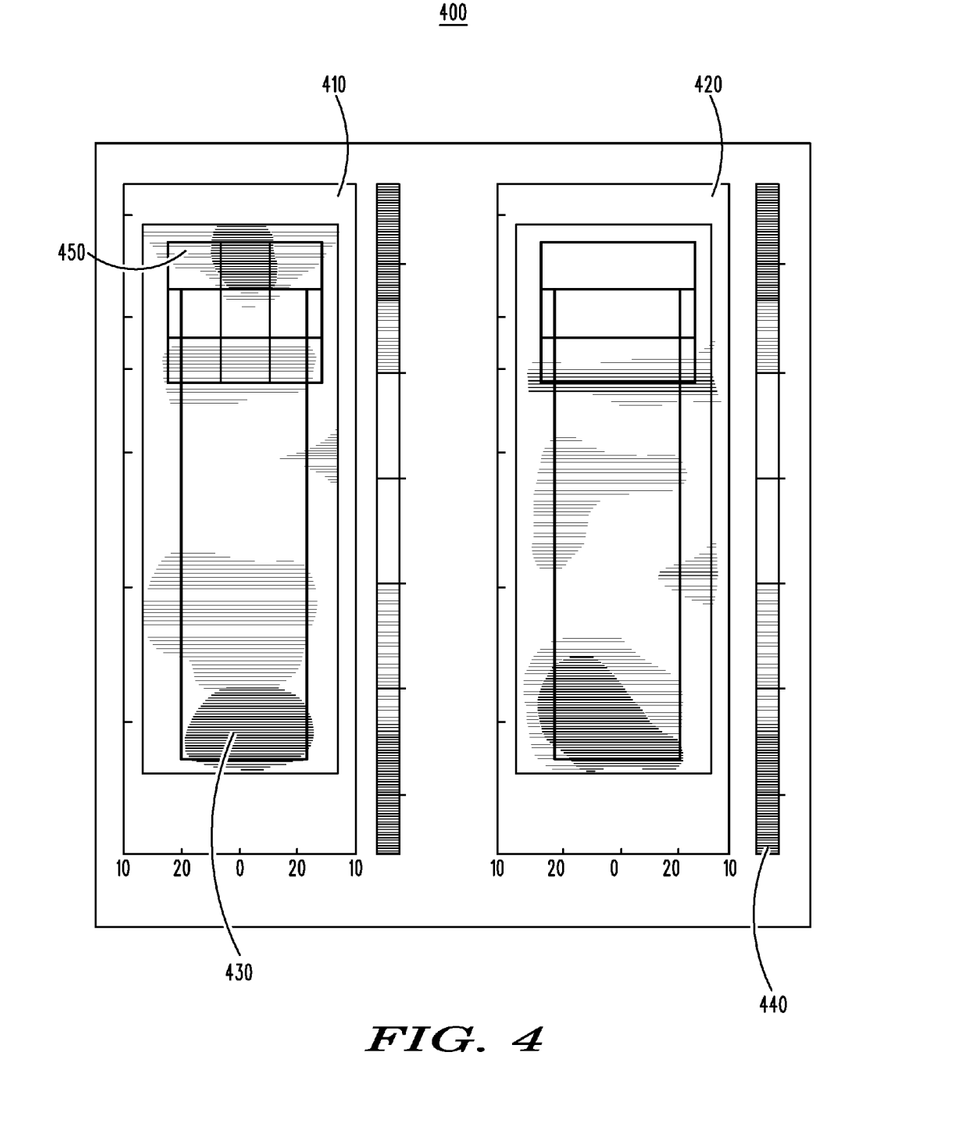
FIG. 4 illustrates two dimensional plot of electric and magnetic (at least for the plot shown) field strength superimposed over various components of the wireless communication device for the case where hinge impedance is shorted.

FIG. 4 illustrates two dimensional plot of electric field strength 400 superimposed over various components of the wireless communication device for the case where hinge impedance is shorted Here the impedance of the first electrical element 350 and second electrical element 360 are selected for high band and reduced HAC performance. The first electrical element is shorted (Z=0+j0) and the second electrical element is shorted (Z=0+j0). The h-field is shown at 410, while the e-field is shown at 420. The HAC Grid 450 and the wireless communication device 430 are shown within the h-field 410 and the e-field 420 distributions. The peak e-field HAC parameter is at 48 dB.

Figure 5:
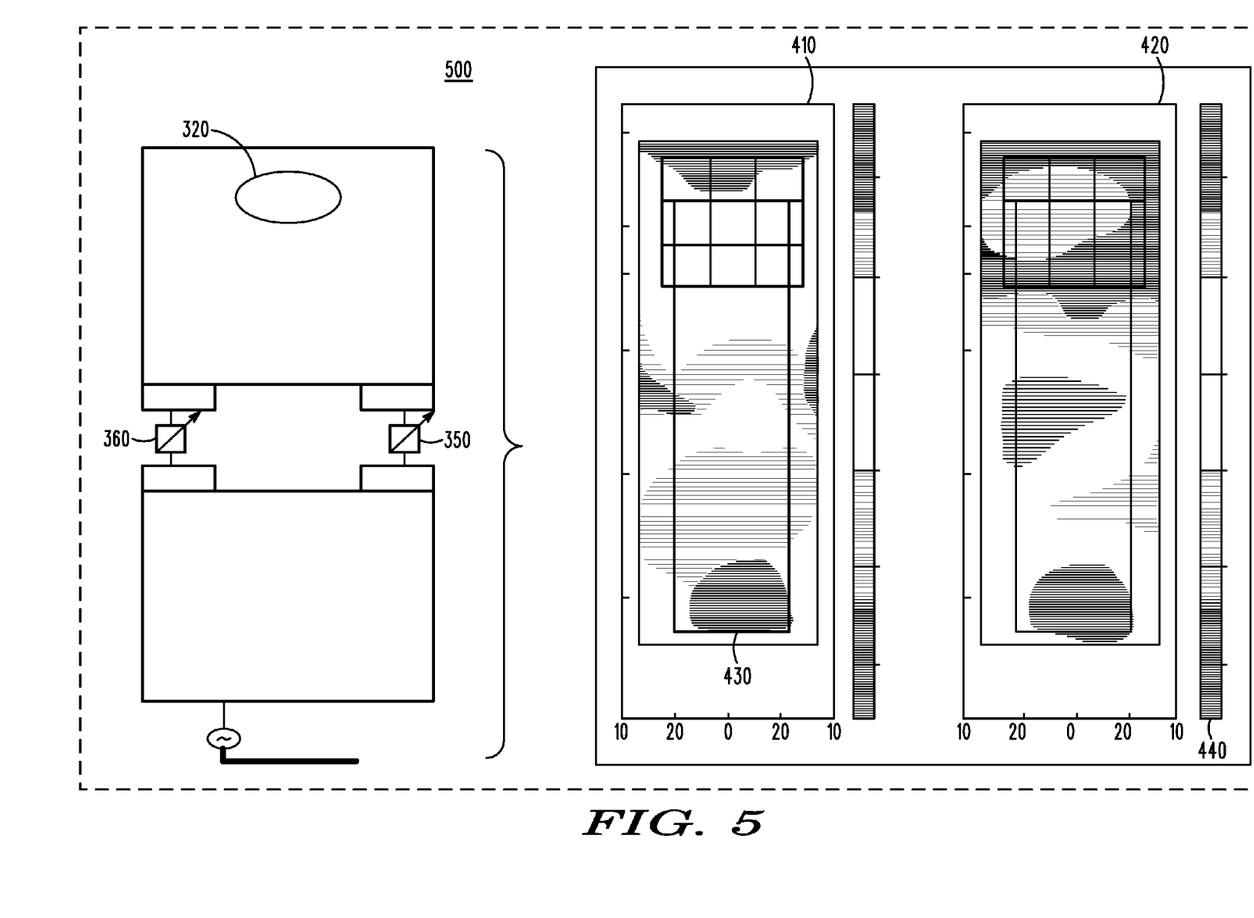
FIG. 5 illustrates two dimensional plot of electric and magnetic field strength superimposed over various components of the wireless communication device for the case where hinge impedance is increased by a known reactance value.

FIG. 5 illustrates two dimensional plot of electric field strength 500 superimposed over various components of the wireless communication device for the case where hinge impedance is not shorted. Here the first electrical element 350 is set to a first impedance (Z=0+j50 ohms) and the second electrical element 360 is set to a second impedance (Z=0+j400 ohms). The peak e-field HAC parameter is improved by 7 dB.

The wireless communication device illustrated in FIG. 2 and the related discussion are intended to provide a brief, general description of a suitable computing environment in which the invention may be implemented. Although not required, the invention will be described, at least in part, in the general context of computer-executable instructions, such as program modules, being executed by the processor, such as a general purpose computer. Generally, program modules include routine programs, objects, components, data structures, etc. that performs particular tasks or implement particular abstract data types. Moreover, those skilled in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like.

Embodiments may also be practiced in distributed computing environments where tasks are performed by local and remote processing devices that are linked (either by hardwired links, wireless links, or by a combination thereof through a communications network. In a distributed computing environment, program modules may be located in both local and remote memory storage devices.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that performs particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the invention are part of the scope of this invention. For example, the principles of the invention may be applied to each individual user where each user may individually deploy such a system. This enables each user to utilize the benefits of the invention even if any one of the large number of possible applications do not need the functionality described herein.

We claim:

1. A wireless communication device comprising:
a lower housing supporting a wireless transceiver, the wireless transceiver being capable of producing an electromagnetic field;
an upper housing positioned adjacent to the lower housing, wherein the upper housing includes an earpiece;
a first electrical element coupling the lower housing and the upper housing, wherein the first electrical element has a first electrical characteristic; and a second electrical element coupling the lower housing and the upper housing, wherein the second electrical element has a second electrical characteristic, wherein at least one of the first electrical element and the second electrical element comprises an impedance different than zero ohms such that a combined impedance of the first electrical element and the second electrical element is configured to be adjusted to a specific complex value such that currents are reduced on the upper housing.

2. A wireless communication device according to claim 1, wherein the wireless communication device further comprises:

a hinge assembly having a first knuckle and a second knuckle for coupling the lower housing to the upper housing.

3. A wireless communication device according to claim 2, wherein the first knuckle forms the first electrical element and the second knuckle forms the second electrical element.

4. A wireless communication device according to claim 3, wherein the first and second electrical elements are selected based on transceiver feed and lower housing and upper housing dimensions.

5. A wireless communication device according to claim 3, wherein the first electrical characteristic and the second electrical characteristic are a function of the width between the first and second knuckle.

6. A wireless communication device according to claim 2, wherein the transceiver is tuned to emit and receive radiation at a range of wavelengths and wherein the first electrical element or the second electrical element by their frequency-dependent nature can be tuned for the range of emitted or received wavelengths.

7. A wireless communication device according to claim 2, wherein the first knuckle includes an aperture through which to guide the first electrical element;

wherein the second knuckle includes an aperture through which to guide the second electrical element; and wherein the first electrical element or the second electrical element is a switch circuit with selectable electrical characteristics.

8. A wireless communication device according to claim 7, wherein the switch circuit is responsive to a currently selected band of transmission.

9. A wireless communication device according to claim 7, wherein the switch circuit is responsive to a geographical bandset.

10. A wireless communication device according to claim 7, wherein the switch circuit is responsive to the position of the upper housing and the lower housing, wherein the position is open or close.

11. The wireless communication device according to claim 1, wherein the combined impedance of the first electrical element and the second electrical element forms an open circuit at least one operating frequency of the transceiver.

12. The wireless communication device according to claim 1, wherein the upper housing comprises an upper housing ground plane, and wherein the combined impedance of the first electrical element and the second electrical element induce an asymmetric current distribution in the upper housing ground plane.

13. A method for providing a hearing aid compatible wireless electronic device, comprising:

providing a lower housing supporting a wireless transceiver, the wireless transceiver being capable of producing an electromagnetic field;

providing an upper housing positioned adjacent to the lower housing, wherein the upper housing includes an earpiece;

providing a first electrical element coupling the lower housing and the upper housing, wherein the first electrical element has a first electrical characteristic; and providing a second electrical element coupling the lower housing and the upper housing, wherein the second electrical element has a second electrical characteristic, wherein at least one of the first electrical element and the second electrical element comprises an impedance different than zero ohms such that a combined impedance of the first electrical element and the second electrical element is configured to be adjusted to a specific complex value such that currents are reduced on the upper housing.

14. The method of claim 13, wherein the first electrical element or the second electrical element is a switch circuit with selectable electrical characteristics.

15. The method of claim 12, wherein the switch circuit is responsive to the position of the upper housing and the lower housing as being open or closed.

16. A communication device comprising:

a lower housing supporting a wireless transceiver, the wireless transceiver being capable of producing an electromagnetic field;

an upper housing positioned adjacent to the lower housing, wherein the upper housing includes an earpiece;

a hinge assembly having a first knuckle and a second knuckle for mechanically coupling the lower housing to the upper housing;

a first electrical element electrically coupling the lower housing and the upper housing, wherein the first electrical element has a first electrical characteristic; and a second electrical element electrically coupling the lower housing and the upper housing, wherein the second electrical element has a second electrical characteristic, wherein a combined impedance of the first electrical element and the second electrical element forms an open circuit at least one operating frequency of the wireless transceiver.

17. The communication device of claim 16, wherein the first knuckle forms the first electrical element and the second knuckle forms the second electrical element.

18. The communication device of claim 17, wherein the transceiver is tuned to emit and receive radiation at a range of wavelengths and wherein the first electrical element or the second electrical element can be selected for the range of wavelengths.

19. The communication device of claim 16, wherein the first knuckle includes an aperture through which to guide the first electrical element;

wherein the second knuckle includes an aperture through which to guide the second electrical element; and wherein the first electrical element or the second electrical element is a switch circuit with selectable electrical characteristics.

20. The communication device of claim 19, wherein the switch circuit is responsive a currently selected band of transmission.

* * * * *